United States Patent
Roy-Faderman et al.

(10) Patent No.: US 10,482,094 B2
(45) Date of Patent: Nov. 19, 2019

(54) CONDITIONAL SELECTION OF COMPOUND FIELDS FROM STRUCTURED OBJECTS

(71) Applicant: salesforce.com, inc., San Francisco, CA (US)

(72) Inventors: Avrom Roy-Faderman, Sunnyvale, CA (US); Carolyn Leigh Grabill, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 543 days.

(21) Appl. No.: 14/536,158

(22) Filed: Nov. 7, 2014

(65) Prior Publication Data

US 2015/0134643 A1   May 14, 2015

Related U.S. Application Data

(60) Provisional application No. 61/901,811, filed on Nov. 8, 2013.

(51) Int. Cl.
*G06F 16/00* (2019.01)
*G06F 7/00* (2006.01)
*G06F 16/248* (2019.01)

(52) U.S. Cl.
CPC ................ *G06F 16/248* (2019.01)

(58) Field of Classification Search
CPC ......... G06F 17/30864; G06F 17/30867; G06F 17/30991; G06F 17/30696; G06Q 30/02
USPC ....................................... 707/722
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |

(Continued)

*Primary Examiner* — Usmaan Saeed
*Assistant Examiner* — Raquel Perez-Arroyo
(74) *Attorney, Agent, or Firm* — Jaffery, Watson, Mendonsa & Hamilton, LLP

(57) ABSTRACT

Embodiments regard conditional selection of compound fields of structured objects. An embodiment of a method for conditionally selecting compound fields from structured objects includes: receiving a query at a database system to select a compound field from any structured object that satisfies a condition; determining by the database system whether a structured object stored in a database satisfies the condition; generating automatically by the database system a plurality of accessors that correspond to a plurality of columns in the compound field associated with the structured object in response to a determination that the structured object satisfies the condition; and providing a result of the query, the result including the plurality of accessors.

23 Claims, 9 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,730,478 B2 | 6/2010 | Weissman |
| 7,779,039 B2 | 8/2010 | Weissman et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0228800 A1* | 10/2005 | Dettinger ................ G06F 16/86 |
| 2006/0122971 A1* | 6/2006 | Berg .................... G06F 9/4493 |
| 2007/0055692 A1* | 3/2007 | Pizzo .................... G06F 16/289 |
| 2009/0144320 A1* | 6/2009 | Weinberg .............. G06F 16/284 |
| 2009/0177744 A1 | 7/2009 | Marlow et al. |
| 2013/0226970 A1* | 8/2013 | Weber ................ G06F 21/6218 |
| | | 707/785 |
| 2014/0172908 A1* | 6/2014 | Konik .................. G06F 16/951 |
| | | 707/769 |

* cited by examiner

COMMON TABLE STRUCTURE

200
Accounts Table

| Name | Value | Street1 | Street2 | City | State | Zip | Billing Street1 | Billing Street2 | Billing City | Billing State | Billing Zip |
|---|---|---|---|---|---|---|---|---|---|---|---|
| | | | | | | | | | | | |
| | | | | | | | | | | | |
| | | | | | | | | | | | |

Address 220 (Street1, Street2, City, State, Zip)
ShippingAddress 240 (Billing Street1, Billing Street2, Billing City, Billing State, Billing Zip)

FIG. 2

FLEX TABLE STRUCTURE

300

Custom Object Data Table

| Name | Rowtype | val0 | val1 | val2 | val3 | val4 | val5 | val6 | val7 | val8 | val9 |
|---|---|---|---|---|---|---|---|---|---|---|---|
| | Object1 | 2135 1st St. | | Apt. 1 | Fresno | | | CA | | | 93711 |
| | Object1 | Landmark | | 1 Market St | San Francisco | | | CA | | | 94105 |
| | Object2 | | | | 61.234° N | | 129.123° W | | | | |

- Object1 stores an address field in val0, val2, val3, val6, val 9 columns
- Object 2 stores a geolocation field in val3 and val5 columns

FIG. 3

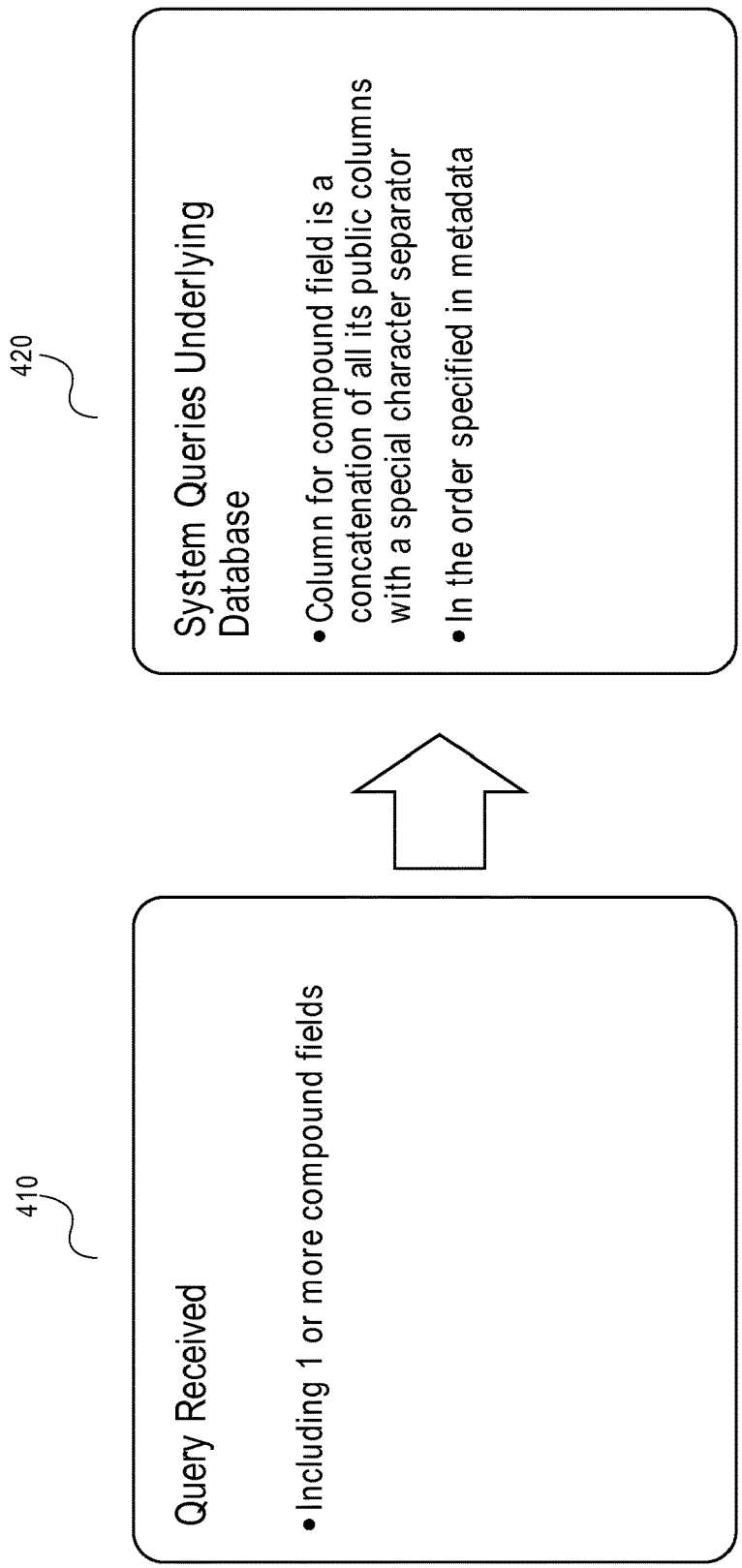

System Constructs Field Object For Each Compound Field

- In strongly typed systems, type for compounds fields set from metadata
- For each compound field, string is split and:
  - Added to response keyed by name
- In strongly typed systems, type for each column set from metadata
- Optionally, if all columns of a compound field are empty, can use null for the field object in full

510

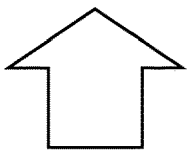

System Returns Response

- In a strongly typed system, the client will be able to parse the response because System generated the API type for fields earlier
- Other systems (such as REST) don't require special parsing; systems make the column values available the same way the column values are available on any generic object

CONDITIONAL SELECTION OF COMPOUND FIELDS FROM STRUCTURED OBJECTS

CROSS REFERENCE TO RELATED APPLICATIONS

This United States patent application is related to, and claims priority to U.S. Provisional Patent Application No. 61/901,811 filed Nov. 8, 2013, entitled "System and Method for Conditionally Selecting Compound Fields From Structured Objects" and the entire contents of which are incorporated herein by reference.

TECHNICAL FIELD

Embodiments relate to techniques for computer database operation. More particularly, embodiments relate to conditional selection of compound fields from structured objects.

BACKGROUND

In a computer database system, structured objects may include compound data types that store data in multiple database columns. Compound data types are in contrast to "complex types" that store structured data in a single database column.

When users of some database systems attempt to conditionally select a compound field from structured objects by entering a query, such as "SELECT SomeField FROM SomeObject WHERE Id='0xxxSomeId'," the database system may respond with a string or primitive (number, Boolean, or similar) as a representation of the value of SomeField instead of responding with the data in the columns of the compound field because of a lack of means to handle the data.

Accordingly, it is desirable to provide technology that enables the conditional selection of compound fields from structured objects.

BRIEF DESCRIPTION OF THE DRAWINGS

Embodiments are illustrated by way of example, and not by way of limitation, in the figures of the accompanying drawings in which like reference numerals refer to similar elements.

FIG. 2 illustrates an exemplary table with common formatting to be accessed according to an embodiment;

FIG. 3 illustrates an exemplary table with custom object formatting to be accessed according to an embodiment;

FIG. 4 illustrates querying with compound field types according to an embodiment;

FIG. 5 illustrates constructing and returning response objects according to an embodiment;

DETAILED DESCRIPTION

In the following description, numerous specific details are set forth. However, embodiments may be practiced without these specific details. In other instances, well-known circuits, structures and techniques have not been shown in detail in order not to obscure the understanding of this description.

In a computing environment, a system may receive a query to select a compound field from any structured object that satisfies a certain condition. For example, a user may submit a query to select billing addresses from account objects for billing addresses that are within five miles of the user's sales headquarters.

In some embodiments, in response to such a query, the system determines whether a structured object satisfies the condition. For example, a column querying application program interface executes to search a database to determine which account objects include columns in compound billing address fields that represent geographic locations that are within a five-mile radius of the user's sales headquarters. As used herein, "column" refers to a designated field of certain data elements of an object, and such columns may or may not be viewed or structured as a column in an object.

In some embodiments, a system is to automatically create accessors that correspond to fields, such as columns, in a compound field associated with a structured object if the structured object satisfies the condition, wherein an accessor is an object, code, or other information for accessing data in the field associated with the accessor. In an example of a billing address field for an object account and a particular sales headquarters for a user, the system may create serializer beans with the appropriate accessors that correspond to, for example, the city, country, country code, latitude, longitude, postal code, state, state code, and street columns in the compound billing address field for the account object because a distance calculating application program interface determined that the latitude and longitude of the account object's compound address field is within a particular distance, such as a five-mile radius, of the latitude and longitude of the user's sales headquarters. In some embodiments, the system generates Web Services Description Language (WSDL) types to hold the values from the structured object.

In some embodiments, a system outputs the accessors as at least part of a result of a query. For instance, using the previous example, the system may output the compound billing address field for each account object with a latitude and longitude within a five-mile radius of the latitude and longitude of the user's sales headquarters. The system may list these results in proximity order, with the closest addresses listed first. In this manner, a system enables users to conditionally select compound fields from structured objects, with the provided result including accessors to allow access to the data elements from the structured objects.

Figure 1:
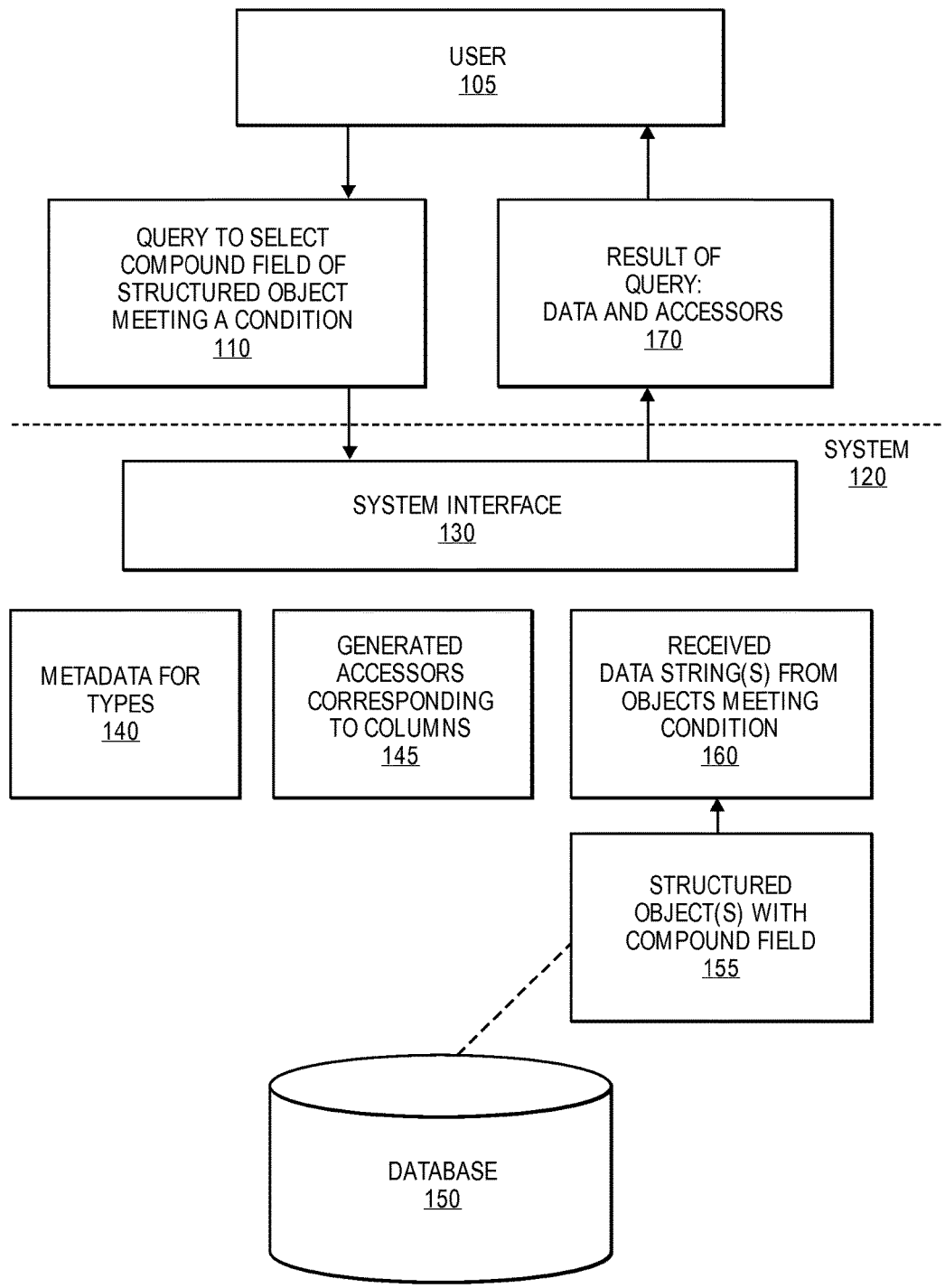
FIG. 1 illustrates retrieval of compound fields according to an embodiment.

FIG. 1 illustrates retrieval of compound fields according to an embodiment. A user 105 may provide a query 110 to a system 120 via a system interface 130, the query to select a compound field of a structured object 155 that includes one or more compound fields, wherein the structured object 155 may be stored in a database 150.

In some embodiments, the system 120 is to generate one or more accessors 145 that correspond to the columns (or other fields) of the structured object 155. The accessors provided for the structured object are to provide for accessing the columns of the structured object 155, thereby enabling conditional selection of the compound fields from the structured object 155. The system 120 may further include metadata for the types of the data stored in the columns of the structured objects 155.

In some embodiments, data may be received from the structured objects meeting the conditions 160. In some embodiments, a result of the query 170 may be returned to the user 105, wherein the results include at least the data received from objects meeting the condition 160 and the generated accessors corresponding to the columns of the structured objects 155.

FIG. 2 illustrates an exemplary table that may be accessed according to an embodiment. In this example, an accounts table 200 is a table with several columns in a standard format. In the accounts table, there are Name and Value columns together with compound field Address 220 (composed of Street1, Street2, City, State, and Zip columns) and compound field ShippingAddress data 240 (composed of Billing Street1, Billing Street2, Billing City, Billing State, and Billing Zip columns). In commonly structured tables, such as table 200, compound field columns are stored inline in the main table, such as the Address compound field 220 and the ShippingAddress compound field 240.

FIG. 3 illustrates a custom object data table that may be accessed according to any embodiment. In this example, a custom objects table 300 is a table with several columns. In the custom objects table, there are columns for Name, Rowtype, and values val0 through val9. However, in such a table, the columns are flexible in value. The table columns may be polymorphic and varying for different objects in the same table. Further, such table values are not required to be contiguous through the columns. For example Object1 stores an address field in non-contiguous columns val0, val2, val3, val6, and val9, without use of val1, val4, val5, val7, and val8. Further, Object2 stores a geolocation in noncontiguous columns val3 and val15, without use of the remaining columns. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system.

In some embodiments, a system allows for retrieval of the compound fields for the table 300 of FIG. 3 with flexible fields and polymorphic table rows, as well as the table 200 of FIG. 2 with a standard format. Each field, whether a standard column or a flexible field, has a "field type". Most standard field types translate fairly easily cross-language, such as, for example, an integer type with most languages that need types having a term for "integer" or a similar concept.

However, compound fields are different than standard columns, and may be utilized in a polymorphic manner. In an API (Application Programming Interface), such as an API that may be used by multiple clients, a system provides specification of the structure of data and provides a manner of presenting data having such structure.

In some embodiments, metadata regarding each of the compound field types, such as their public names, what their column (or other field) data types and public column names are, and which of the columns are publically exposed, is internally maintained. In some embodiments, such metadata may be utilized multiple times in a system. In some embodiments, in an initial process for APIs requiring strong types for values (such as, for example, SOAP (Simple Object Access Protocol)), an API type (e.g., a WSDL element) is generated from the internal metadata.

FIG. 4 illustrates querying with compound field types according to an embodiment. In some embodiments, a query may be received, the query including one or more compound fields 410. In some embodiments, the system queries the underlying database 420. In some embodiments, a column for a compound field is a concatenation of all of its public columns with a special character separator, with the data being provided in the order specified in the metadata stored on the system.

FIG. 5 illustrates constructing and returning response objects according to an embodiment. In some embodiments, a system constructs a field object for each compound field 510. In a strongly typed system, a type for compound fields is set from the metadata. For each compound field, the resulting data string is split and is added to a response keyed by name, and, in strongly typed systems, the type for each column is set from metadata. In some embodiments, optionally, if all columns of a compound field are empty, a "null" may be used for the field object in full.

In some embodiments, the system returns a response 520. In a strongly typed system, the system is able to parse the response because the API type for the client has been generated. Other systems, such as REST (Representational State Transfer), don't require special parsing. In non-strongly typed systems, the column values may be made available in the manner that such values are available on any generic object.

Figure 6:
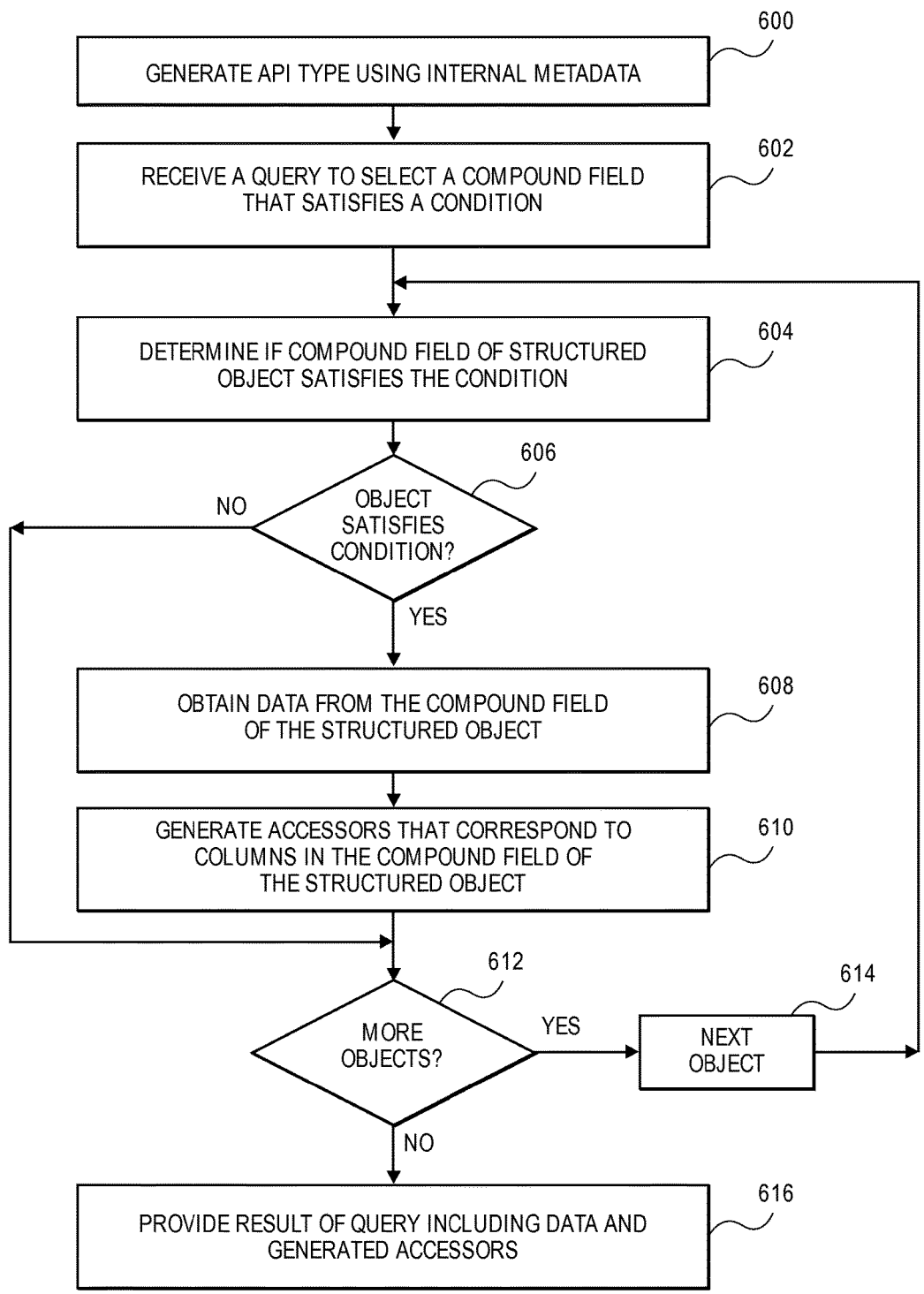
FIG. 6 is a flowchart to illustrate a process for handling queries for conditional selection of compound fields from structured objects according to an embodiment.
Figure 7:
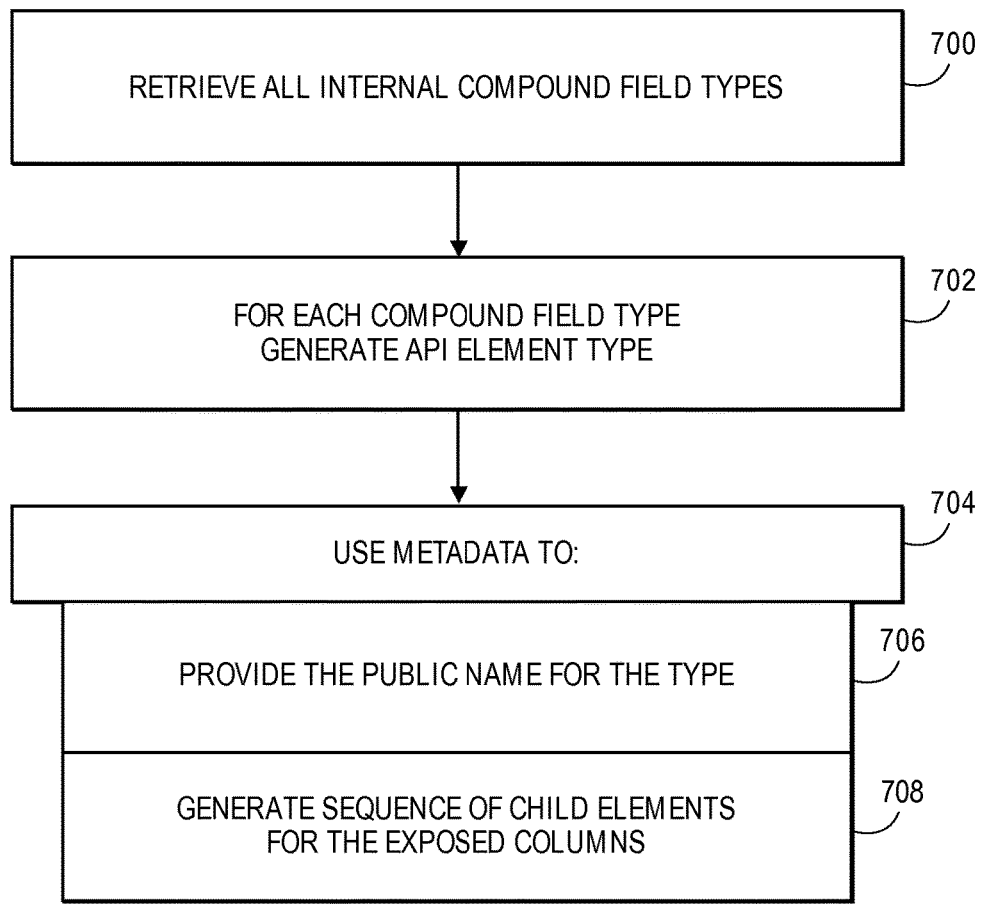
FIG. 7 is a flowchart to illustrate a process for generation of API type according to an embodiment.

FIG. 6 is a flowchart to illustrate a process for handling queries according to an embodiment. In some embodiments, an initial process may include generating an API type using internal metadata 600, such as illustrated in FIG. 7. In some embodiments, a query is received, the query to select a compound field that satisfies a certain specified condition 602. In some embodiments, there is determination if the compound field of a structured object satisfies the specified condition 604. If the compound field of the structured object does satisfy the condition 606, then the data for the compound field is obtained 608 and accessors that correspond to the fields (such as columns) in the compound field associated with the structured object are generated 610. Following such process or following a determination that a structured object does not satisfy the condition 606 there is determination whether there are more objects to be considered 612, and, if so, the process continues with another structured object 614 and the determination of whether the compound field of the structured object satisfies the condition.

Upon determining that there are no more structured objects to be considered 612, the result of the query, including the compound field data and the generated accessors, is provided to the requesting user 616. In this manner, the user receives that can be accessed using the generated accessors.

FIG. 7 is a flowchart to illustrate a process for generation of API type according to an embodiment. In some embodiments, in an initial process for APIs requiring strong types for values, an API type is generated from the internal metadata, where the generation may include:

(a) Retrieving all internal compound field types 700; and (b) For each type, generating an API element type 702 (in an example, for SOAP the API element type is a complexType in the WSDL), using metadata 704 to:

(i) Provide the type and the relevant public name 706, and (ii) Generate a sequence of child elements 708, wherein there is a child element for each exposed column and wherein the name and data type of the child elements are derived from the metadata.

The examples illustrating the use of technology disclosed herein should not be taken as limiting or preferred. This example sufficiently illustrates the technology disclosed without being overly complicated. It is not intended to illustrate all of the technologies disclosed. A person having ordinary skill in the art will appreciate that there are many potential applications for one or more implementations of this disclosure and hence, the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions, stored in the memory, to perform a method as described above.

The implementations include:

In some embodiments, an apparatus for conditionally selecting compound fields from structured objects includes a processor; and one or more stored sequences of instructions that, when executed by the processor, cause the processor to carry out the steps of: receiving a query to select a compound field from any structured object that satisfies a condition; determining whether a structured object satisfies the condition; creating a plurality of accessors that correspond to a plurality of columns in the compound field associated with the structured object in response to a determination that the structured object satisfies the condition; and outputting the plurality of accessors as at least part of a result of the query.

In some embodiments, a machine-readable medium, such as a non-transitory computer-readable storage medium, carries one or more sequences of instructions for conditionally selecting compound fields from structured objects, which instructions, when executed by one or more processors, cause the one or more processors to carry out a process of: receiving a query to select a compound field from any structured object that satisfies a condition; determining whether a structured object satisfies the condition; creating a plurality of accessors that correspond to a plurality of columns in the compound field associated with the structured object in response to a determination that the structured object satisfies the condition; and outputting the plurality of accessors as at least part of a result of the query.

In some embodiments, a method for conditionally selecting compound fields from structured objects includes: receiving a query to select a compound field from any structured object that satisfies a condition; determining whether a structured object satisfies the condition; creating a plurality of accessors that correspond to a plurality of columns in the compound field associated with the structured object in response to a determination that the structured object satisfies the condition; and outputting the plurality of accessors as at least part of a result of the query.

Figure 8:
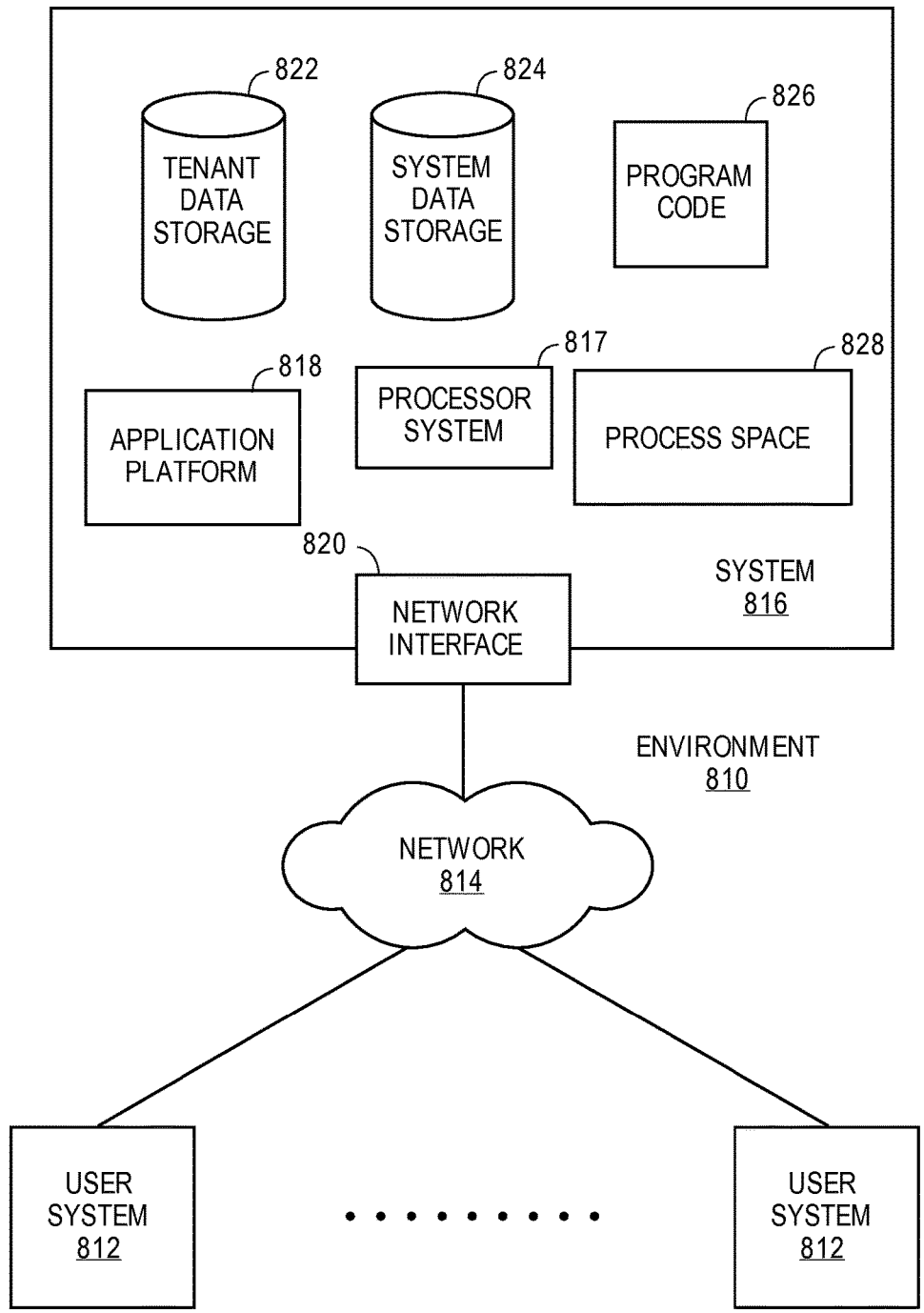
FIG. 8 illustrates a block diagram of an environment providing conditional selection of compound objects according to an embodiment.
Figure 9:
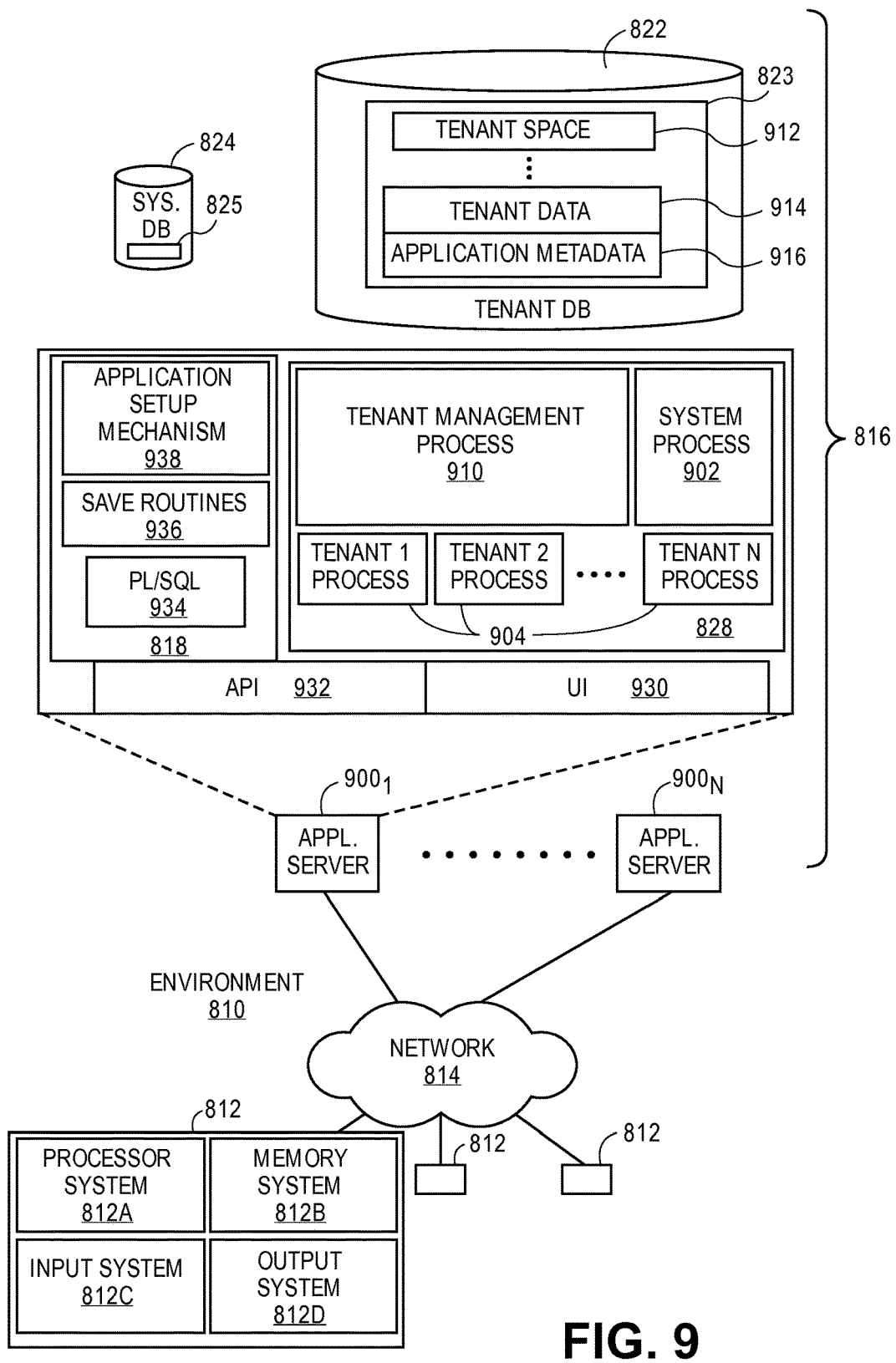
FIG. 9 illustrates details of an environment providing conditional selection of compound objects according to an embodiment.

FIG. 8 illustrates a block diagram of an environment providing conditional selection of compound objects according to an embodiment, and FIG. 9 illustrates details of an environment providing conditional selection of compound objects according to an embodiment. Components within an environment 810 may belong to different layers (e.g., compute, management) and may communicate as described above. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a mobile phone, a laptop computer, a work station, and/or a network of computing devices. As illustrated in FIG. 8, and in more detail in FIG. 9, user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein.

A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the Internet, that network will be used in many of the examples herein. However, it should be understood that the networks that are used in one or more implementations may not be so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop or notebook, tablet computer, smart phone, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer, Firefox, Chrome, or a mobile operating system browser in the case of a smart phone, cellular phone, or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen, gesture recognition, or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel processor, including Celeron®, Pentium®, Core®, and Xeon® processors, or the like. Similarly, system 816 (and additional instances of an MTS, where more than one is present) and all of their components might be operator configurable using application(s) including computer code to run using a central processing unit such as processor system 817, which may include an Intel processor or the like, and/or multiple processor units.

A computer program product embodiment includes a machine-readable storage medium (media), including non-transitory computer-readable storage media, having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SQL 934, save routines 936, application setup mechanism 938, applications servers 900₁-900ₙ, system process space 902, tenant process spaces 904, tenant management process space 910, tenant storage space 912, tenant data 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (illustrated in FIG. 8) implemented as a set of HTTP application servers 900, an application platform 818, tenant data storage 822, and system data storage 824.

Also shown in FIG. 9 is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage spaces 912, which can be either a physical arrangement and/or a logical arrangement of data. Within each tenant storage space 912, tenant data 914 and application metadata 916 might be similarly allocated for each user. For example, a copy of a user's most recently used (MRU) items might be stored to tenant data 914. Similarly, a copy of MRU items for an entire organization that is a tenant might be stored to tenant storage space 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SQL 934 that provides a programming language style interface extension to API 932. A detailed description of some PL/SQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server 900₁ might be coupled via the network 814 (e.g., the Internet), another application server 900ₙ₋₁ might be coupled via a direct network link, and another application server 900ₙ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. As indicated above, U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described, but can be practiced with modification and alteration within the spirit and scope of the appended claims. The description is thus to be regarded as illustrative instead of limiting.

What is claimed is:

1. A method for conditionally selecting compound fields from structured objects, the method comprising:

generating an application programming interface (API) type for a database of a database system, the API type including types of fields of a plurality of structured objects stored in the database, wherein the database includes one or more compound fields, each compound field includes a plurality of fields for each of a plurality of structured objects stored in a database, and the plurality of fields include one or more flexible fields that have a different field type for a first structured object and a second structured object;

receiving a query from a user at the database system to select a compound field of the database from any structured object that satisfies a condition specified in the query;

determining by the database system whether any structured object of the plurality of structured objects stored in the database satisfies the condition;

upon a determination that one or more structured objects of the plurality of structured objects satisfy the condition, generating automatically by the database system a plurality of program objects or codes based at least in part on one or more field types that are within the one or more structured objects, wherein generating the plurality of program objects or codes includes generating a set of one or more program objects or codes that correspond to the plurality of fields in the compound field associated with each of the one or more structured objects that satisfy the condition, each a generated program object or code being structured to enable the user to access data in a field that is associated with the program object or code according to the values for the fields in each of the one or more structured objects; and providing a result of the query to the user, the result of the query including:

data from the one or more structured objects that are determined to satisfy the condition specified in the query, and the plurality of program objects or codes generated for the one or more structured objects to enable the user to access the data provided to the user from the one or more structured objects.

2. The method of claim 1, wherein the plurality of fields are columns of the compound field and wherein the one or more structured objects include one or more rows of the compound field.

3. The method of claim 1, wherein the result of the query includes a data output generated from the fields of the compound field of the one or more structured objects.

4. The method of claim 1, further comprising maintaining metadata regarding types of the fields of the plurality of structured objects stored in the database.

5. The method of claim 4, wherein the metadata includes one or more of public names of the types, data types and public field names, and which of the fields are publicly exposed.

6. The method of claim 1, wherein the plurality of fields are fields of a strongly typed system.

7. The method of claim 1, wherein generating the plurality of program objects or codes includes the database system generating serializer beans including the plurality of program objects or codes.

8. The method of claim 1, wherein the one or more structured objects include the first structured object and the second structured object, and wherein the plurality of program objects or codes includes a first set of program objects or codes to access data elements in the first structured object and a second, different set of program objects or codes to access data elements in the second structured object.

9. An apparatus comprising:

a data storage for a database, the database including a plurality of structured objects, the apparatus to generate an application programming interface (API) type for the database, the API type including types of fields of a plurality of structured objects stored in the database, wherein the database includes one or more compound fields, each compound field includes a plurality of fields for each of a plurality of structured objects stored in a database, and the plurality of fields include one or more flexible fields that have a different field type for a first structured object and a second structured object;

a system interface to receive queries regarding the database; and a processor to process queries, wherein upon the apparatus receiving a query from a user to select a compound field of the database from any structured object that satisfies a condition specified in the query, the processor is to:

determine whether any structured object of the plurality of structured objects stored in the database satisfies the condition;

upon a determination that one or more structured objects of the plurality of structured objects satisfy the condition, automatically generate a plurality of program objects or codes based at least in part on one or more field types that are within the one or more structured objects, wherein generating the plurality of program objects or codes includes generating a set of one more program objects or codes that correspond to the plurality of fields in the compound field associated with each of the one or more structured objects that satisfy the condition, each generated program object or code being structured to enable the user to access data in a field that is associated with the program object or code according to the values for the fields in each of the one or more structured objects; and provide a result of the query to the user, the result of the query including:

data from the one or more structured objects that are determined to satisfy the condition specified in the query, and the plurality of program objects or codes generated for the one or more structured objects to enable the user to access the data provided to the user from the one or more structured objects.

10. The apparatus of claim 9, wherein the plurality of fields are columns of the compound field and wherein the one or more structured objects include one or more rows of the compound field.

11. The apparatus of claim 9, wherein the result of the query includes a data output generated from the fields of the compound field of the one or more structured objects.

12. The apparatus of claim 9, wherein the apparatus is to maintain metadata regarding types of the fields of the plurality of structured objects stored in the database.

13. The apparatus of claim 12, wherein the metadata includes one or more of public names of the types, data types and public field names, and which of the fields are publicly exposed.

14. The apparatus of claim 9, wherein generating the plurality of program objects or codes includes the database system generating serializer beans including the plurality of program objects or codes.

15. The apparatus of claim 9, wherein the one or more structured objects include the first structured object and the second structured object, and wherein the plurality of program objects or codes includes a first set of program objects or codes to access data elements in the first structured object and a second, different set of program objects or codes to access data elements in the second structured object.

16. A non-transitory computer-readable storage medium having stored thereon data representing sequences of instructions that, when executed by a processor, cause the processor to perform operations comprising:

generating an application programming interface (API) type for a database of a database system, the API type including types of fields of a plurality of structured objects stored in the database, wherein the database includes one or more compound fields, each compound field includes a plurality of fields for each of a plurality of structured objects stored in a database, and the plurality of fields include one or more flexible fields that have a different field type for a first structured object and a second structured object;

receiving a query from a user at the database system to select a compound field of the database from any structured object that satisfies a condition specified in the query;

determining by the database system whether any structured object of the plurality of structured objects stored in the database satisfies the condition;

upon a determination that one or more structured objects of the plurality of structured objects satisfy the condition, automatically generating by the database system a plurality of program objects or codes based at least in part on one or more field types that are within the one or more structured objects, wherein generating the plurality of program objects or codes includes generating a set of one or more program objects or codes that correspond to the plurality of fields in the compound field associated with each of the one or more structured objects that satisfy the condition, each generated program object or code being structured to enable the user to access data in a field that is associated with the program object or code according to the respective values for the fields in each of the one or more structured objects; and providing a result of the query to the user, the result of the query including
- data from the one or more structured objects that are determined to satisfy the condition specified in the query, and
- the plurality of program objects or codes generated for the one or more structured objects to enable the user to access the data provided to the user from the one or more structured objects.

17. The storage medium of claim 16, wherein the plurality of fields are columns of the compound field and wherein the one or more structured objects include one or more rows of the compound field.

18. The storage medium of claim 16, wherein the result of the query includes a data output generated from the fields of the compound field of the one or more structured objects.

19. The storage medium of claim 16, further comprising instructions that, when executed by the processor, cause the processor to perform operations comprising maintaining metadata regarding types of the fields of the plurality of structured objects stored in the database.

20. The storage medium of claim 19, wherein the metadata includes one or more of public names of the types, data types and public field names, and which of the fields are publicly exposed.

21. The storage medium of claim 16, wherein the plurality of fields are fields of a strongly typed system.

22. The storage medium of claim 16, wherein generating the plurality of program objects or codes includes the database system generating serializer beans including the plurality of program objects or codes.

23. The storage medium of claim 16, wherein the one or more structured objects include the first structured object and the second structured object, and wherein the plurality of program objects or codes includes a first set of program objects or codes to access data elements in the first structured object and a second, different set of program objects or codes to access data elements in the second structured object.

* * * * *